Figure 1:
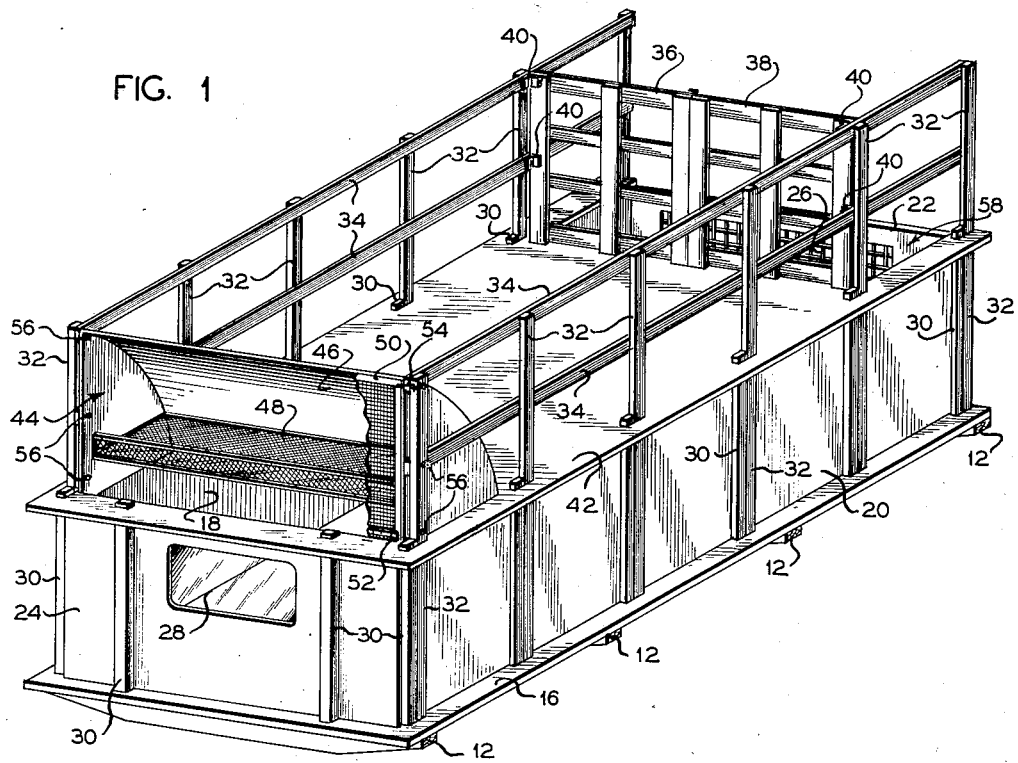

Sept. 30, 1952

H. L. McGAN 2,612,027

DOUBLE-DECKED STOCK TRUCK COOLING
AND VENTILATING SYSTEM

Filed June 5, 1950

INVENTOR.
H. L. McGAN
BY
A. Yates Dowell
ATTORNEY

Patented Sept. 30, 1952

2,612,027

UNITED STATES PATENT OFFICE 2,612,027

DOUBLE-DECKED STOCK TRUCK COOLING AND VENTILATING SYSTEM

Herman L. McGan, Uniontown, Ky., assignor of one-half to Ezra C. Walker, Henderson, Ky.

Application June 5, 1950, Serial No. 166,225

4 Claims. (Cl. 62—13)

1

This invention relates to stock truck bodies and more particularly to a double deck body for carrying small animals such as hogs and sheep which is provided with means for ventilating and cooling the substantially enclosed lower deck.

Cooling units have been proposed for trucks, railway cars and the like which are complicated, expensive and require an elaborate system with ducts for distributing fresh or cooled air. Other systems employ receptacles for ice suspended in a stock car which would interfere with the animals and might cause injury thereto. Still others merely set cakes of ice on the floor and provide fans for air circulation, but the cakes will slide and cause commotion and possible damage to the stock.

An object of this invention is to overcome the disadvantages enumerated above and provide a simple inexpensive double deck stock truck body having a cooling unit which utilizes a minimum space and effectively ventilates and cools the lower deck and prevents overheating of the stock and the resultant loss of animals.

Another object of this invention is to provide a construction whereby a conventional stake body or stock truck may be readily converted into a double deck truck having an enclosed lower deck with adequate ventilating and cooling means and an open partially enclosed upper deck for carrying a large number of small animals and in addition one or more larger animals if desired.

The truck body of the present invention is preferably adapted to be mounted on a flat body truck and is provided with a lower deck which is substantially enclosed except for a window in the forward wall and a grill in the rear wall. The upper deck covers only a portion of the lower deck to provide room for the cooling and ventilating unit at the forward end and an open space at the rear where one or more larger animals can stand. The rear part of the upper deck is provided with a pair of pivotally mounted gates, and the sides are enclosed by an open framework. The cooling and ventilating unit consists of a curved deflector which directs the air downwardly into the enclosed lower deck and a wire mesh rack which is adapted to hold pieces of ice and is mounted between the side wall of the deflecting shield in the path of airflow to cool the air. The front of the cooling unit is provided with a screened service gate pivoted on hinges along its bottom edge and providing access to the unit for putting ice in the ice rack.

2

Figure 2:
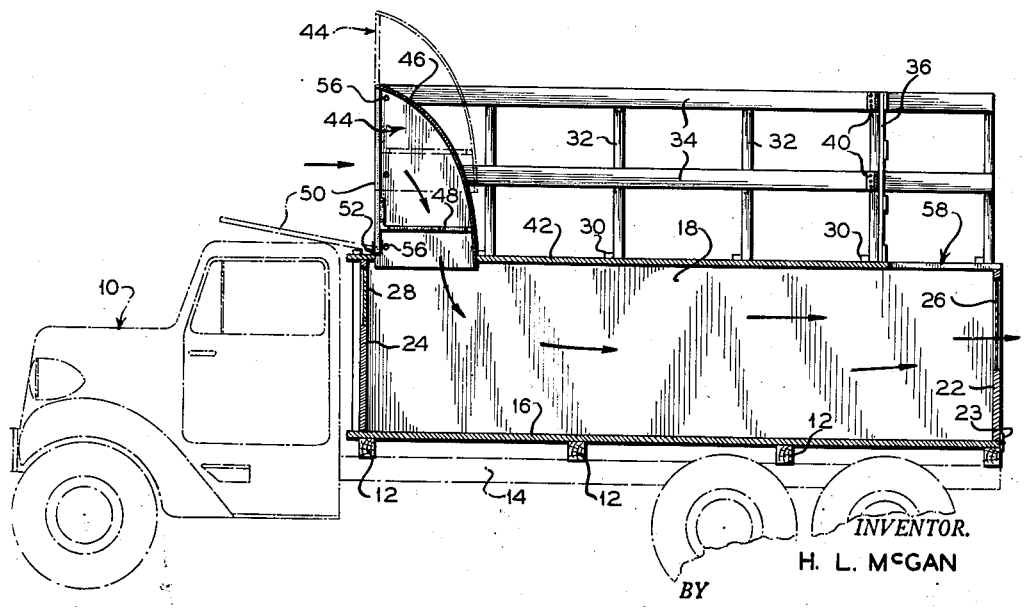

Further objects and advantages of the present invention will be apparent from the following description taken in conjunction with the accompanying drawing, wherein:

Fig. 1 is a perspective view of a truck body showing one preferred form of the present invention; and, Fig. 2, a side elevation showing the truck in phantom lines and the truck body of the present invention in longitudinal section.

Referring now to the drawing in detail and particularly to Fig. 2, the truck 10 is shown in phantom lines and mounted thereon is a truck body constituting one preferred form of the present invention.

A plurality of transverse supporting members 12 are mounted on the flat bed 14 of the truck 10 and mounted on members 12 is the floor 16 of the lower deck which is enclosed by side panels 18 and 20, a rear panel 22 and a front panel 24. The rear panel 22 has a grille section 26 in the upper portion and is hinged at 23 to the floor 16 or one of the members 12. The front panel 24 has a window 28 provided so that the truck driver can look through the cab window (not shown) and ascertain the condition of the animals in the enclosed lower deck.

A plurality of vertical stakes 30 and 32 extend along the side portions, stakes 30 extending only to the top of the enclosed lower portion and stakes 32 extending upwardly to form part of the framework surrounding the upper deck. A plurality of horizontal members 34 complete the framework for the sides of the upper deck, said horizontal members 34 being secured to vertical stakes 32 and removable therewith.

Gates 36 and 38 are mounted on hinges 40 secured to two of the stakes 32 adjacent the rear portion of the upper deck. Floor 42 of the upper deck only partially covers the enclosed lower deck and leaves a space adjacent the forward and rearward ends, the purpose of which will be described subsequently.

A ventilating and cooling unit 44 is mounted in the space adjacent the forward end and is provided with a curved deflector 46 which directs the air downwardly into the enclosed lower deck as indicated by the arrows. A rack 48 is attached to the back and side walls adjacent the lower portion of deflector 46 and is adapted to receive a plurality of small pieces of ice for cooling the air during hot weather. A screened service gate 50 is hinged at 52 to provide access to the cooling unit for putting ice in the rack 48. The service gate 50 is pivotally mounted along its bottom edge on hinges 52 and is provided with a hook and eye latch 54 adjacent each end at the upper portion thereof.

The ventilating and cooling unit 44 is adjustably secured to the end posts 32 by means of equally spaced bolts or other fastening elements 56 at each end of the device. Vertical adjustment of the ventilating and cooling unit is accordingly possible as illustrated in phantom lines in Fig. 2 by supporting the ventilating and cooling unit in the two lowermost openings in each end between the two uppermost bolts. Also, if desired, the corner posts 32 may be made vertically slidable to accomplish the same result.

An opening 58 is provided in the floor 42 behind gates 36 and 38. This space may be utilized for one or more larger animals standing on the lower deck. This is particularly for a rancher who may desire to transport a horse out to the range for rounding up small animals such as sheep and then bring the horse back in the truck with the sheep.

It will be apparent that with the structure of the present invention the double deck truck body may be readily converted into a conventional truck body. Each of the side enclosures of the upper deck consisting of the long stakes may be removed as a unit and the gates 36 and 38 detached by separating the hinges 40 from the stakes 32 to which they are secured. The cooling unit may be detached by unscrewing the flanges 56 from the floor 42 and each removed separately or they may both be removed together as a single unit.

The side framework can be replaced to form a conventional stock truck body for larger animals or if desired the side panels 18 and 20 and the front panel 24 secured to the shorter stakes 30 can be removed and rear panel 22 detached by separating the hinge 23 to form a flat body truck.

If desired, the opening 58 may be eliminated and floor 42 extended to the rear of the truck with the gates 36 and 38 at the extreme rear also, since the grille 26 provides for flow of air out of the enclosed lower deck.

With the construction described the present invention is applicable to a double deck vehicle as shown, or if desired, it may be appropriately applied to single deck vehicles and the height of the cooling medium supported in the most appropriate vertical position in accordance with the height of the animals transported and in order to provide maximum beneficial results.

It will be readily apparent that if desired a tarpaulin or other covering could be applied over the entire truck body and with the deck 42 removed and the height of the ventilating and cooling unit properly adjusted the cooling will be effective within the whole enclosed portion of the stock truck body.

It will be obvious to those skilled in the art that various changes may be made in the invention without departing from the spirit and scope thereof and therefore this invention is not limited by that which is shown in the drawings or described in the specification but only as indicated in the appended claims.

What is claimed is:

1. A double deck stock truck body comprising a plurality of transverse supports, a lower floor mounted on said supports, a plurality of removable vertical stakes extending upwardly adjacent both side edges of said floor, an upper floor mounted in spaced relation above said lower floor, side panels and front and rear panels substantially enclosing the space between said floors to form an enclosed lower deck for transportation of small animals, said upper floor being shorter than said lower floor to provide a space adjacent the front and rear edges thereof, gates pivotally mounted on certain of said stakes adjacent the rear edge of said upper floor, horizontal bars mounted on certain of said stakes extending above said upper deck floor to form a side framework of an upper deck for transportation of additional small animals, said open space rearwardly of said upper deck and said gates providing for transportation of larger animals, a cooling unit mounted above the space adjacent the forward edge of said upper floor, said cooling unit having a curved deflector with side walls and an ice rack mounted on said deflector between said side walls, a screened service gate extending across the front of said cooling unit and providing access thereto, said cooling unit being adapted to receive air from the outside through said screened service gate and direct it downwardly over said ice rack and into said enclosed lower deck, and a grille in said rear panel providing for egression of air from said enclosed lower deck.

2. A double deck stock truck body comprising a lower floor, a plurality of vertical stakes extending upwardly adjacent both side edges of said lower floor, an upper floor mounted in spaced relation above said lower floor, side panels and front and rear panels substantially enclosing the space between said floors to form a substantially enclosed lower deck for transportation of small animals, said upper floor being shorter than said lower floor to provide a space adjacent the front edge thereof, a framework including horizontal bars mounted on said stakes above said upper deck floor and gate means adjacent the rear portion of said upper deck to form a partially enclosed upper deck for transportation of additional small animals, a cooling unit mounted above the space adjacent the forward edge of said upper floor, said cooling unit having a curved deflector and an ice rack mounted therein, a screened service gate extending across the front of said cooling unit and providing access thereto, said cooling unit being adapted to receive air from the outside through said screened service gate and direct it downwardly over said ice rack and into said enclosed lower deck, and a grille in said rear panel providing for egression of air from said enclosed lower deck.

3. A double deck stock truck body comprising a lower floor, an upper floor mounted in spaced relation above said lower floor, side panels and front and rear panels substantially enclosing the space between said floors to form an enclosed lower deck, said upper floor being shorter than said lower floor to provide a space adjacent the front portion thereof, a framework around a portion of said upper deck floor to form a partially enclosed upper deck, a cooling unit mounted above the space adjacent the forward edge of said upper floor, said cooling unit having a curved deflector and an ice rack mounted therein, said cooling unit being adapted to receive air from the outside and direct it downwardly over said ice rack and into said enclosed lower deck, and means adjacent the rear of said lower deck providing for egression of air from said enclosed lower deck.

4. A multiple deck structure for use in transportation comprising a lower load carrying floor, an upper load carrying floor mounted in spaced relation above the lower load carrying floor, retaining means by which a load may be retained on said upper load carrying floor, side, front, and rear walls connecting said upper and lower load carrying floors and forming an enclosure with an opening in its forward portion for the admission of air and with an outlet from its rear portion for the egress of air, a cooling unit mounted near the forward end of said enclosure exteriorly of the same in a manner that the interior of the enclosure is unobstructed, said cooling unit having communication with said opening and having a deflector and a refrigerant container, said deflector serving to direct air from the exterior over said refrigerant container and into said enclosure.

HERMAN L. McGAN.

REFERENCES CITED

The following references are of record in the file of this patent:

UNITED STATES PATENTS

| Number | Name | Date |
|---|---|---|
| 262,662 | Gouge | Aug. 15, 1882 |
| 575,704 | Daly | Jan. 26, 1897 |
| 584,729 | Monteverde | June 15, 1897 |
| 982,571 | Brown | Jan. 24, 1911 |
| 2,129,438 | Nitsche | Sept. 6, 1938 |
| 2,475,715 | Mull | July 12, 1949 |